Dec. 2, 1930.   E. D. KOHR   1,783,799
MOLD FOR FORMING CONES FOR ICE CREAM AND FROZEN CUSTARD
Filed March 20, 1930
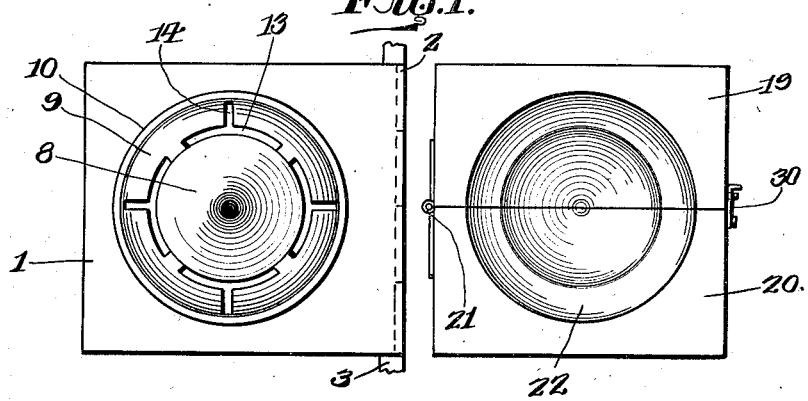
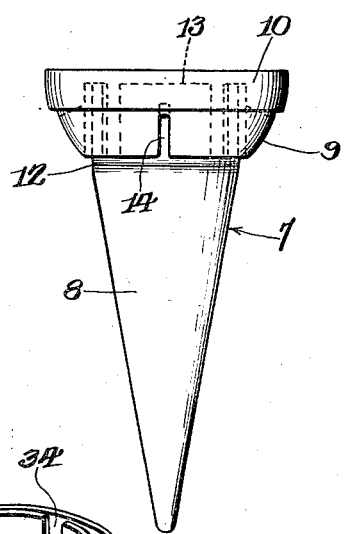
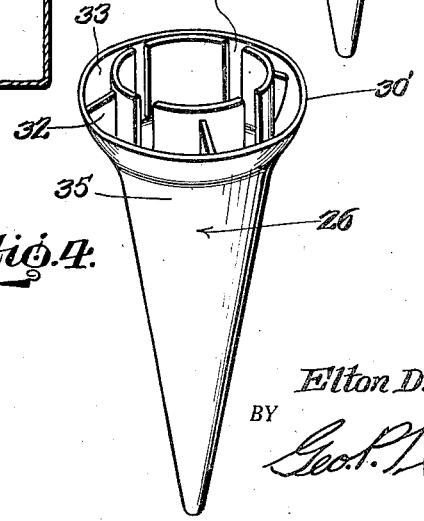
INVENTOR:
Elton D. Kohr
BY
Geo. P. Kimmel
ATTORNEY.

Patented Dec. 2, 1930

1,783,799

UNITED STATES PATENT OFFICE

ELTON D. KOHR, OF YORK, PENNSYLVANIA

MOLD FOR FORMING CONES FOR ICE CREAM AND FROZEN CUSTARD

Application filed March 20, 1930. Serial No. 437,553.

This invention relates to a mold for producing edible ice cream cones, and has for its object to provide, in a manner as hereinafter set forth, a new, novel, thoroughly efficient, conveniently adjusted mold for producing an ice cream cone provided with means within the upper portion thereof to constitute respectively a seat for the batch or lump of ice cream and means for collecting and directing the melting cream into the body of the cone to prevent dripping from the exterior of the latter.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a plan view of the mold when open.

Figure 2 is a vertical sectional view of the mold when closed to receive the material for the purpose of molding the cone.

Figure 3 is an elevation of the core.

Figure 4 is a perspective view of the cone produced by the mold.

The mold includes a core, a hinged carrier for the latter, and a body portion formed of a pair of hinged sections having coacting recesses to provide in connection with the core a molding cavity to produce the article from an edible substance. The sections of said body portion are hollow to form a pair of heating chambers for the purpose of cooking the edible material when supplied to the molding cavity.

The carrier, designated at 1, is in the form of a flat, rectangular plate adapted to be hinged at one end, as at 2 to a support 3. The carrier 1 is provided with an opening 4 for the passage of a heat conducting pipe 5 for a purpose to be presently referred to.

The core is referred to generally at 7 and is of circular cross section and substantially solid. The core 7 includes a tapered part 8, a flared intermediate part 9 of greater diameter than that of the part 8, and an upper flared part 10 of greater diameter than the part 9. The part 9, as well as the part 10 is in the form of a zone of a sphere. The outer face of the part 9 is upon a greater arc than the outer face of the part 10. The part 10 projects laterally throughout, at its bottom with respect to the top of the part 9. The core 7 is connected to the lower face of the carrier 1, by a suitable holdfast means 11 in a manner whereby the axis of the core will be disposed at a point between the transverse median of the carrier and its non-hinged end. The diameter of the part 10 is less than the width and length of the carrier 1.

The tapered part 8 at its upper end has the portion designated 12 of uniform diameter. The core 7 is formed with a series of spaced, perpendicular, arcuate sockets 13 arranged in the form of a circular row and each having the inner wall thereof forming a continuation of the portion 12 of the part 8. Each socket 13 opens at the bottom of the part 9 and each socket is of a length to extend entirely through the part 9 and into the part 10, but terminates at a point below the upper face of part 10.

The part 9 is provided with a series of radially disposed notches 14 substantially of quadrangular contour, opening at the outer face of part 9 and into the sockets 13. The notches 14 are of less height than the height of the sockets 13. Each notch opens into a socket 13 centrally of the outer wall of the latter. The inner wall 15 of each notch inclines downwardly from a socket 13 to the outer face of part 9.

That portion of the part 10 which projects laterally with respect to the part 9 is disposed at a downward inclination, as at 16 toward the outer face of part 10. The inclined portion 16 is positioned above the outer ends of the inner walls of the notches 14.

The core 7 is formed with an annular heat receiving channel 17 which is arranged within the parts 9 and 10 and has its top wall spaced from the top of the part 10, and the latter is provided with an opening 18 which registers with the opening 4 in the carrier 1. The opening 18 also communicates with the channel 17. The heat conducting pipe 5 not only extends through opening 4 in carrier 1 but also is positioned in opening 18 of part 10 and communicates with the channel 17, and the latter has its outer wall positioned in close proximity to the inner walls of the sockets 13.

The body portion of the mold includes a pair of oppositely disposed hollow sections 19, 20 hinged together as at 21. Each section has its inner face formed with a recess 22. When the inner faces of the sections of the body portion are in abutting relation, the recesses 22 register and coact to provide a pocket corresponding in contour to the shape of the core, but of slightly greater diameter throughout than the diameter of the core, whereby when the core is positioned in the pocket and sustained therein by the carrier the core will coact with the walls of the pocket to provide a molding cavity 23 having extensions 24 and 25 at the upper portion thereof. The extensions being provided by the sockets 13 and notches 14. The part 10 of the core 7 provides a closure for the top of the molding cavity 23 and the inclined portion 16 of said part 10 forms the top edge of the cone 26 which is produced by the mold.

Each section of the body portion provides a heating chamber 27 into which leads a heat conducting pipe 28 from a suitable source of heat supply. Each section of the body portion carries a conducting pipe or tube 29 for supplying the material from which the cone is produced to the molding cavity 23. The sections 19, 20 of the body portion are provided with a suitable latch, as indicated at 30 for coupling them in abutting relation during the molding operation.

Although the walls of the molding cavity are shown plain, yet they can be set up in a manner so as to ornament the outer periphery of the cone.

The form of cone produced, the cone being indicated at 26, includes a head part 30' of saucer-like shape in cross section, a series of perpendicular, spaced arcuate supporting members 31 arranged in a circular row and radially disposed webs 32 integral with the inner face of the head 30' and with the outer faces of the members 31. The members 31 are of greater height than the head 30' and the webs 32. The members 31 are spaced throughout from the inner face of the head 30' and in connection with the latter and the webs 32 provide a series of compartments 33 to receive drippings or melting cream from the batch of cream positioned upon the supporting means provided by the members 31. The spaces 34 between the ends of the members 31 form drain openings or passages whereby the drippings or melting cream are directed into the tapered portion of the cone.

The parts 9 and 10 of the core in connection with a portion of the walls of the recesses provide the head 30' and the notches 14 the webs and the sockets 13 the perpendicular supporting members 31 having their lower ends integral with the point of mergence of the head 30' with the upper end of the tapered part 35 of the cone.

After the cone has been molded, as well as cooked or baked the sections of the body portion are released or shifted away from each other, the carrier is then swung upwardly carrying the core with the completed cone on the latter and after the core has cleared the body portion the cone is removed therefrom.

The construction of the cone produced by the mold is such that when the cone is used for holding a frozen edible, the outside surface of the cone will be free of drippings from the edible and therefore the soiling of the fingers or clothes of the purchaser will be prevented.

What I claim is:

1. A mold for the purpose set forth comprising a body portion formed of a pair of oppositely disposed hinged sections having coacting means on the inner faces thereof to provide, when said faces are in abutting relation a pocket having a tapered lower portion and a flaring upper portion, a hinged carrier seating on said body portion, a core secured to said carrier for positioning in said pocket, said core conforming in contour substantially to the shape of said pocket and coacting with the wall of the latter to provide a molding cavity, and said core having means in its upper portion to provide the upper end of the molding cavity with radially disposed extensions and vertically disposed perpendicular extensions of arcuate form.

2. A mold for the purpose set forth comprising a body portion formed of a pair of oppositely disposed hinged sections having coacting means on the inner faces thereof to provide, when said faces are in abutting relation a pocket having a tapered lower portion and a flaring upper portion, a hinged carrier seating on said body portion, a core secured to said carrier for positioning in said pocket, said core conforming in contour substantially to the shape of said pocket and coacting with the wall of the latter to provide a molding cavity, said core having means in its upper portion to provide the upper end of the molding cavity with radially disposed extensions and vertically disposed perpendicular extensions of arcuate form, and said core and said sections having heat receiving means.

3. In a mold for the purpose set forth, a core formed of a tapered lower part having its upper portion of uniform diameter, a flaring intermediate part in the form of a zone of a sphere and of greater diameter than said lower part, a flaring upper part in the form of a zone of a sphere and of greater diameter than and projecting laterally from the top of the intermediate part, said core formed with a series of spaced arcuate sockets provided in said upper and intermediate parts and opening at the bottom of the intermediate part, said sockets disposed lengthwise with respect to the core and having their upper ends positioned below the top of the upper part, the inner walls of said sockets forming continuations of the periphery of said upper portion of uniform diameter, and said intermediate part formed with radially disposed notches opening at the outer face of said part and into said sockets centrally of the outer walls of the latter.

4. A mold for the purpose set forth comprising a body portion formed of a pair of oppositely disposed hinged sections having coacting means on the inner faces thereof to provide, when said faces are in abutting relation a pocket having a tapered lower portion and a flaring upper portion, a hinged carrier seating on said body portion, a core secured to said carrier for positioning in said pocket, said core conforming in contour substantially to the shape of said pocket and coacting with the wall of the latter to provide a molding cavity, said core having means in its upper portion to provide the upper end of the molding cavity with radially disposed extensions and vertically disposed perpendicular extensions of arcuate form, said core and said sections having heat receiving means, and means for conducting the material to be molded to the molding cavity.

In testimony whereof, I affix my signature hereto.

ELTON D. KOHR.